US009904803B2

(12) United States Patent
Xing et al.

(10) Patent No.: US 9,904,803 B2
(45) Date of Patent: *Feb. 27, 2018

(54) TECHNOLOGIES FOR HARDENING DATA ENCRYPTION WITH SECURE ENCLAVES

(71) Applicant: Intel Corporation, Santa Clara, CA (US)

(72) Inventors: Bin Cedric Xing, Hillsboro, OR (US); Reshma Lal, Hillsboro, OR (US); Dheeraj Subbareddy, Hillsboro, OR (US)

(73) Assignee: INTEL CORPORATION, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/667,916

(22) Filed: Mar. 25, 2015

(65) Prior Publication Data

US 2016/0283747 A1 Sep. 29, 2016

(51) Int. Cl.
*G06F 21/71* (2013.01)
*G06F 21/74* (2013.01)
*G06F 21/60* (2013.01)

(52) U.S. Cl.
CPC .......... *G06F 21/71* (2013.01); *G06F 21/602* (2013.01); *G06F 21/74* (2013.01)

(58) Field of Classification Search
CPC ...... G06F 21/6218; G06F 21/53; G06F 21/71; G06F 21/602; G06F 21/74
See application file for complete search history.

(56) References Cited

U.S. PATENT DOCUMENTS

| 8,578,477 | B1 | 11/2013 | Lin et al. |
| 2002/0051538 | A1 | 5/2002 | Kaplan et al. |
| 2003/0101322 | A1 | 5/2003 | Gardner |
| 2003/0140245 | A1 | 7/2003 | Dahan et al. |
| 2005/0149726 | A1 | 7/2005 | Joshi et al. |
| 2008/0208924 | A1 | 8/2008 | Bradshaw et al. |
| 2012/0159184 | A1 | 6/2012 | Johnson et al. |
| 2013/0159726 | A1* | 6/2013 | McKeen ............... G06F 21/72 713/189 |
| 2013/0298251 | A1 | 11/2013 | Mittal |
| 2014/0006711 | A1 | 1/2014 | Xing |

(Continued)

OTHER PUBLICATIONS

Intel (Intel® Hardware-based Security Technologies for Intelligent Retail Devices, 2013, 6 pages).*

(Continued)

*Primary Examiner* — Oleg Korsak
(74) *Attorney, Agent, or Firm* — Grossman, Tucker, Perreault & Pfleger, PLLC

(57) ABSTRACT

Technologies for hardening encryption operations are disclosed. In some embodiments, the technologies harden encryption operations typically performed by kernel mode programs with a secure enclave that may run in user mode and/or in a pre-boot context. In some embodiments, the technologies leverage a shared buffer and a proxy to enable the use of a secure enclave hosted in user mode to perform encryption operations. In additional embodiments, the technologies utilize one or more pre-boot applications to enable the use of a secure enclave in a pre-boot phase, e.g., so as to enable the use of a secure enclave to decrypt data that may be needed to boot a computing device.

22 Claims, 5 Drawing Sheets

(56) References Cited

U.S. PATENT DOCUMENTS

| | | | |
|---|---|---|---|
| 2014/0068704 A1* | 3/2014 | Grewal | H04L 63/0428 726/1 |
| 2014/0108795 A1 | 4/2014 | Bi | |
| 2014/0337983 A1 | 11/2014 | Kang et al. | |
| 2016/0092678 A1* | 3/2016 | Probert | G06F 21/55 713/193 |

OTHER PUBLICATIONS

Encryption | Android Open Source Project, http://source.android.com/devices/tech/security/encryption/ (available prior to Mar. 25, 2015).

Related U.S. Appl. No. 14/369,252, filed Jun. 27, 2014.

International Search Report and Written Opinion issued in PCT Application No. PCT/US2016/019475, dated Jul. 20, 2016.

International Preliminary Report on Patentability and Written Opinion issued in PCT Application No. PCT/US2013/075598, dated Jun. 30, 2016, 7 pages.

International Search Report and Written Opinion issued in PCT Application No. PCT/US2013/075598, dated Sep. 29, 2014, 9 pages.

Office Action issued in U.S. Appl. No. 14/369,252, dated Nov. 18, 2016, 19 pages.

\* cited by examiner

TECHNOLOGIES FOR HARDENING DATA ENCRYPTION WITH SECURE ENCLAVES

TECHNICAL FIELD

The present disclosure generally relates to technologies for hardening data encryption with one or more secure enclaves. More particularly, the present disclosure relates to technologies for hardening data encryption operations typically performed by kernel mode programs with a secure enclave, which may be run in user mode and/or in a pre-boot context. Devices, systems, and methods employing such technologies are also disclosed.

BACKGROUND

Disk encryption software is often used to encrypt and decrypt information as it is being stored to or read from data storage, e.g., a hard drive, solid state disk, and the like. In such instances data encryption is often performed by an application running in kernel mode using an encryption key. Data encrypted with the encryption key is generally safe provided the encryption key (or a corresponding decryption key) remains protected. In this regard, a wide range of technologies are available for protecting encryption and/or decryption keys from access by unauthorized parties. For example, a key may be protected by wrapping the key in a user provided pass phrase, sealing the key with a trusted platform module and/or a smart card, and the like.

Although existing key protection technologies are useful, they are not completely secure. This is due to the fact that many encryption technologies expose the plain text of a key in memory as encryption operations are being performed on plain text or cipher text. This presents an opportunity for an enterprising hacker and/or malware to obtain the plain text of a key.

For example an unauthorized third party may execute a so called "cold-boot" attack to cause an encryption system to dump the content of its physical memory, including the plain text of a key therein, after which the third party may recover the key from the resulting dump file. Alternatively the third party may execute a so-called "evil maid" attack to install a key logger to intercept a user passphrase as it is entered, which could then be used by the third party to recover the plain text of the encryption key. Similarly a "blue-pill" attack could be implemented to create a virtual machine monitor (VMM) beneath the software stack of a client system. Depending on the implementation, the VMM could be employed to capture of the encryption key directly, or to capture a user pass phrase which could be used to recover the plain text of the encryption key.

In view of the foregoing interest has grown in technologies for hardening disk encryption. In particular, interest has grown in technologies for protecting the key(s) used to encrypt and decrypt information during the performance of encryption operations.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

DETAILED DESCRIPTION

Figure 1:
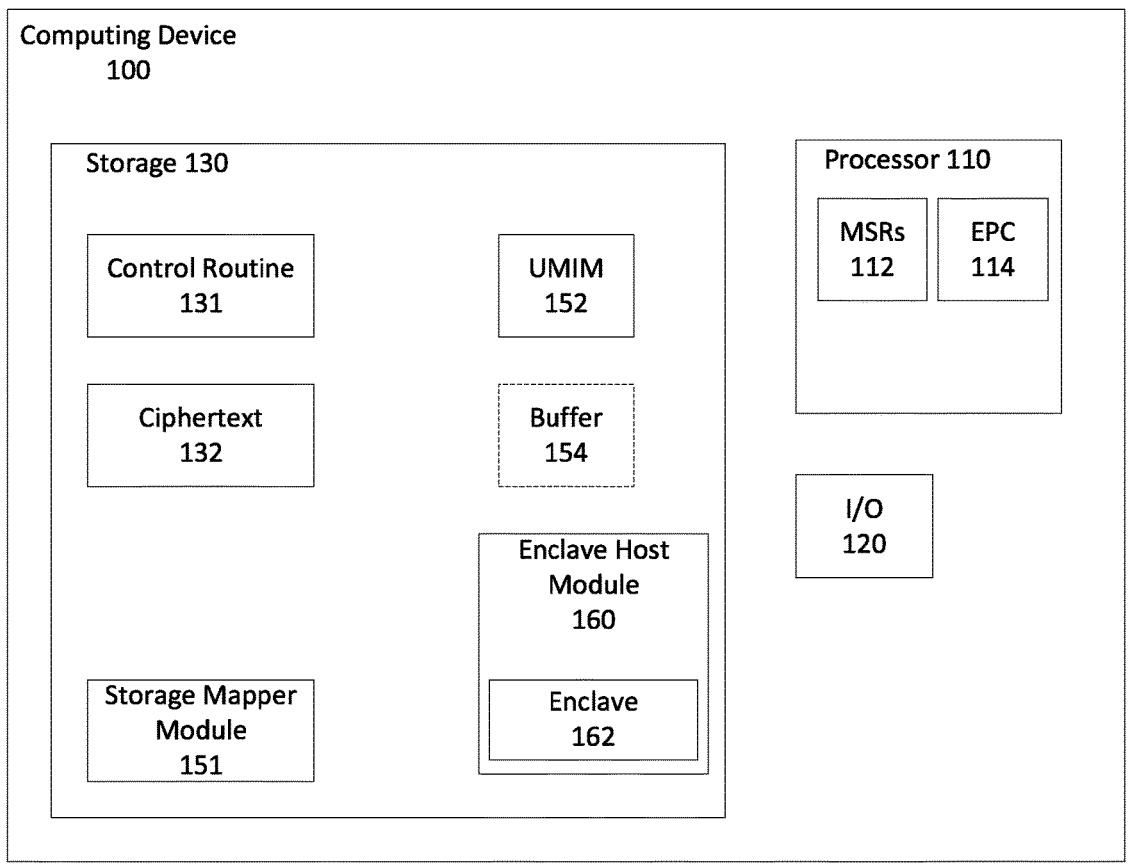
FIG. 1 illustrates an example embodiment of an electronic device implementing a secure enclave to harden data encryption operations consistent with the present disclosure.

While the present disclosure is described herein with reference to illustrative embodiments for particular applications, it should be understood that such embodiments are exemplary only and that the invention as defined by the appended claims is not limited thereto. Indeed for the sake of illustration the technologies described herein may be discussed in the context of one or more use cases in which plain text of data is encrypted prior to being written to a disk (e.g., a hard drive, a solid state disk, and the like) or cipher text of data read from a disk is decrypted. Such discussions are for the sake of example only, and it should be understood that all or a portion of the technologies described herein may be used in other contexts. Those skilled in the relevant art(s) with access to the teachings provided herein will recognize additional modifications, applications, and embodiments within the scope of this disclosure, and additional fields in which embodiments of the present disclosure would be of utility.

With general reference to notations and nomenclature used herein, portions of the detailed description that follow may be presented in terms of program procedures executed on a computer or network of computers. These procedural descriptions and representations are used by those skilled in the art to most effectively convey the substance of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the required purpose. Various embodiments also relate to apparatus or systems for performing these operations. These apparatus may be specially constructed for the required purpose or may include a general purpose computer. The required structure for a variety of these machines will be apparent from the description given.

In the context of the present disclosure the terms "computing device" and "electronic device" are interchangeably used to refer to the wide range of devices that may be utilized to perform encryption operations at least in part with a secure enclave. Non-limiting examples of suitable computing devices include cameras, cell phones, computer terminals, desktop computers, electronic readers, facsimile machines, kiosks, netbook computers, notebook computers, internet devices, payment terminals, personal digital assistants, media players and/or recorders, servers, set-top boxes, smart phones, tablet personal computers, televisions, ultra-mobile personal computers, wired telephones, combinations thereof, and the like. Such devices may be portable or stationary. Without limitation, the client's described herein are preferably in the form of a cellular phone, desktop computer, electronic reader, laptop computer, set-top box, smart phone, tablet personal computer, television, or ultra-mobile personal computer.

As used herein, the terms "disk," "storage," and "storage device" are used interchangeably herein to refer to one or more non-volatile memory devices that may be used to provide non-volatile data storage. Non-limiting examples of storage devices that may be used herein include magnetic storage devices (e.g., magnetic hard drives, magneto-optical drives, thermally assisted magnetic recording devices, magnetic disks, etc.), solid state storage devices (e.g., storage devices employing non-volatile solid state NOT AND (NAND) or NOT OR (NOR) memory), memory sticks and/or cards including non-volatile memory, combinations thereof, and the like.

The phrase "encryption operations" is used herein to generally refer to the encryption of plain text into cipher text, the decryption of cipher text into plain text, or some combination thereof, as appropriate. The term "encryption operations" should therefore be understood to encompass both encryption and decryption of data, with the appropriate interpretation being given based on the context in which the phrase is used.

As used in any embodiment herein, the term "module" may refer to software, firmware and/or circuitry that are configured to perform one or more operations consistent with the present disclosure. Software may be embodied as a software package, code, instructions, instruction sets and/or data recorded on non-transitory computer readable storage mediums. Firmware may be embodied as code, instructions or instruction sets and/or data that are hard-coded (e.g., nonvolatile) in memory devices. "Circuitry", as used in any embodiment herein, may comprise, for example, singly or in any combination, hardwired circuitry, programmable circuitry such as computer processors comprising one or more individual instruction processing cores, state machine circuitry, software and/or firmware that stores instructions executed by programmable circuitry. The modules may, collectively or individually, be embodied as circuitry (e.g., as logic implemented at least in part in hardware) that forms a part of one or more client devices.

As will be described in detail later, the technologies of the present disclosure utilize one or more secure enclaves (also referred to herein as a "memory enclave" or simply, an "enclave") to harden data encryption operations performed by a computing device. In general, a secure enclave is made up of at least one memory page that has a different access policy than the access policy imposed by traditional ring boundaries of a computing device. The memory page(s) within a secure enclave may have associated read/write controls which may be configured such that the read/write controls have exclusivity over certain operating modes or privilege "rings", system management mode or virtual machine monitors of an associated processor. A secure enclave may therefore be designed to provide a sheltered place to host and execute trusted code, data, and the like such that it may be protected from other software on a client, including application software and privileged software such as an operating system, a virtual machine monitor, combinations thereof, and the like. Without limitation, suitable secure enclaves include those that may be provided using INTEL® secure enclave technology, which may be implemented using Intel secure guard instructions (SgX) or in another manner. Of course, other suitable memory enclave technologies may be used.

For example, in some embodiments the technologies described herein utilize a secure enclave to provide a secure location for the storage of one or more keys that may be used to perform encryption operations. Alternatively or additionally, in some embodiments encryption operations may be performed within a secure enclave such that the key(s) stored therein is/are never exposed in memory. As may be appreciated, this may limit or even prevent unauthorized third parties from obtaining the key(s) used to perform encryption operations from the physical memory of the computing device.

In some embodiments a secure enclave may be used to protect a key stored therein by wrapping it based on a measurement of the enclave itself. In such embodiments, it may be necessary to unwrap the key (using the measurement of the enclave) before it can be used to perform encryption operations. As may be appreciated if the measurement of the enclave changes in any manner (e.g., due to tampering) after a key is wrapped, unwrapping of the key may not be possible. This can effectively prevent a third party from accessing the plain text of a key via an attack that tampers with or otherwise targets the enclave itself.

It is noted that due to their nature and use of specially encrypted memory locations, interaction with secure enclaves may be limited to applications executed in user mode. With this in mind, many data encryption suites utilize encryption applications that are executed in kernel mode. This is particularly true in instances where the encryption application is responsible for performing full or partial disk encryption operations, wherein data to be written to all or a specified portion of a disk is to be encrypted prior to being committed (written) to the disk. Many existing encryption suites are therefore unable to leverage a secure enclave due to constraints that may limit or prevent interaction between the enclave (which may be run in user mode) and an encryption application (which may be run in kernel mode). As will be described below one aspect of the present disclosure relates to devices and methods that aim to address this issue.

In some use cases such as full or partial disk encryption, all or a portion of the data needed to boot a computing device may be stored as cipher text on a disk. In such instances one or more applications (e.g., a BIOS level encryption application) may employ an encryption/decryption key in a pre-boot phase to decrypt applications/data needed to boot the client device from the disk, after which the device may be booted normally. While effective, that method may expose the plain text of the key(s) in system memory where it may be subject to attack by an unauthorized third party. With this in mind, another aspect of the present disclosure relates to technologies for enabling the use of a secure enclave to harden encryption operations that may be performed prior to or during boot of a computing device, e.g., in a full or partial disk encryption context. As will be appreciated, such technologies can enable the use of enclaves (typically executed in a user mode context) in a pre-boot phase, i.e., prior to when user mode applications are typically executed.

Reference is now made to the drawings, wherein like reference numerals are used to refer to like elements throughout. It is noted that for the purpose of clarity and ease of understanding, the following description focuses on the use of secure enclaves to harden encryption operations in particular use cases. Although numerous details with regard to those use cases may be provided it should be understood that the technologies described herein can be practiced in other contexts, potentially without some or all of the details provided with regard to the specific use cases described herein. It is also noted that for the sake of clarity, well known structures and devices are shown in block diagram form. The intention is to cover all modifications, equivalents, and alternatives within the scope of the appended claims.

With the foregoing in mind FIG. 1 depicts components of the system architecture of one example embodiment of a computing device that is configured to implement a secure enclave to harden encryption operations consistent with the present disclosure. As shown, computing device 100 includes processor 110, input output interface (I/O) 120, and storage 130. Such components may be communicatively coupled to one another in any suitable manner, such as via a bus or other suitable communications medium (not shown). Various components such as physical (e.g., random access) memory, displays, etc. that may be commonly found in modern computing devices have been omitted from FIG. 1 for the sake of clarity.

Computing device 100 may be any type of computing device that is suitable for performing encryption operations at least in part with a secure enclave. Examples of such devices are enumerated above, and so are not reiterated. Regardless of its form factor, computing device 100 is generally configured to enable the use of a secure enclave running in user mode to perform encryption operations that would otherwise be performed by one or more applications executed in kernel mode. It should be understood that while FIG. 1 depicts a single computing device 100 that is configured in this manner, the various operations and components described herein may be incorporated and/or implemented among a plurality of computing devices.

Processor 110 may be any suitable general purpose processor or application specific integrated circuit, and may be capable of executing one or multiple threads on one or multiple processor cores. Without limitation in some embodiments processor 110 is a general purpose processor, such as but not limited to the general purpose processors commercially available from INTEL® Corp., ADVANCED MICRO DEVICES®, ARM®, NVIDIA®, APPLE®, and SAMSUNG®. While FIG. 1 illustrates computing device 100 as including a single processor, multiple processors including one or multiple processing cores may be used. Without limitation, processor 110 in some embodiments is a past, present or future produced single or multicore INTEL® processor.

Regardless of its type, processor 110 may be configured to provide different modes of operation, referred to as "kernel mode" and "user mode." Processor 110 may switch between kernel and user mode based on the privilege level of an application that it is executing or is to execute. In general, applications that may be used to initialize and provide interface functionality to components of the computing device (e.g., drivers, operating system (OS) components, pre-boot applications, or the like) have kernel level privileges and therefore operate in kernel mode. That is, processor 110 is configured to operate in kernel mode when executing those types of applications. In contrast, most other applications have user level privileges and therefore processor 110 is configured to operate in user mode when executing such applications.

As further shown in FIG. 1, processor 110 may include one or more model specific registers (MSRs 112) and a secure enclave page cache (EPC) 114. As processor 110 executes control routine 131, it may set one or more MSRs 112 to enable switching between user mode and kernel mode operation. For example, one or more MSRs 112 may be set to enable SYSCALL/SYSRET instructions, which can switch processor 110 between user mode and kernel mode.

It is noted that while FIG. 1 depicts EPC 114 as being included in processor 110, EPC 114 may be present in another component of computing device 100, such as but not limited to storage 130, platform local memory (e.g., DRAM and the like), memory accessible by a basic input output system (BIOS), and the like. In some embodiments, EPC 114 is stored in a cryptographically protected region of platform local memory of computing device 100. In other embodiments, EPC 114 is stored in a cryptographically protected region of storage 130. In still further embodiments, EPC 114 is stored in a cryptographically protected region of a BIOS accessible memory.

I/O 120 may include hardware (i.e., circuitry), software, or a combination of hardware and software that is configured to allow computing device 100 to transmit and receive data among its respective components, and optionally to one or more external devices. Such communication may occur over a wired or wireless connection using a close and/or long range communications network. I/O 120 may therefore include hardware to support such communication, e.g., one or more transponders, antennas, BLUETOOTH™ chips, personal area network chips, near field communication chips, network interface cards, combinations thereof, and the like.

Storage 130 may be any suitable storage device or combination of storage devices, such as those noted above. Without limitation, in some embodiments storage 130 is in the form or one or more magnetic hard drives, solid state drives (SSD), smart cards, universal serial bus (USB) drives, memory sticks, combinations thereof, or the like. As shown, storage 130 may store one or more of control routine 131, cipher text 132 (e.g., in a full or partial disk encryption use case), storage mapper module 151, user mode interface module (UMIM) 152, buffer 154, enclave host module 160, and secure enclave 162. It should be understood that while buffer 154, enclave host module 160, and secure enclave 162 are depicted as being stored on storage 130, such an implementation is not required. Indeed, such components may be implemented in any suitable memory and memory location, such as but not limited to memory local to processor 110 (e.g., processor cache memory), system physical memory (e.g., DRAM), combinations thereof, and the like.

Control routine 131 includes a sequence of instructions that are operative on processor 110 to implement logic to perform various functions. For example, in executing control routine 131, processor 110 may provide kernel mode support for kernel mode components such as storage mapper module 151, and UMIM 152. In addition, execution of control routine 131 by processor 110 may provide user mode support for user mode components such as enclave host module 160, enclave 162, and other user mode applications (not shown in FIG. 1). As will be described in detail later UMIM 152 may serve as a conduit for directing data such as cipher text 132 (e.g., from storage 130) and/or plain text (e.g., from one or more user mode applications) to buffer 154, such that is available for the performance of encryption operations by enclave 162. In addition, in some embodiments UMIM 152 may be configured to cause computing device 100 (or, more particularly, processor 110) to establish a proxy (not shown in FIG. 1) that may be leveraged to enable communication between UMIM 152 (a kernel mode application) and enclave host most 160 (a user mode application).

In various embodiments control routine 131 may include one or more of an operating system (OS), device drivers and/or application-level routines (e.g., so-called "software suites" provided on disc media, "applets" obtained from a remote server, etc.). Where an operating system is included, the operating system may be any of a variety of available operating systems appropriate for computing device 100 and/or processor 110, such as but not limited to a MICROSOFT® WINDOWS® operations system, MAC® OS®, a LINUX® operating system, an ANDROID® operating system, a UNIX® operating system, or any other operating system for a mobile or other electronic device. Where one or more device drivers are included, those device drivers may provide support for any of a variety of other components, whether hardware or software components of the computing device 100.

In some embodiments, control routine 131 (or come component thereof) may operate to create secure enclave 162. For example, control routine 131 may include a kernel mode driver that creates secure enclave 162. The kernel mode driver may create secure enclave 162 in any suitable manner, such as by allocating at least one memory page to EPC 114, and extending an enclave image into the location of the allocated memory page(s). If desired, The enclave may then be transferred to enclave host module 160, e.g., by performing a mapping operation to map the memory pages within EPC 114 allocated to enclave 162 to enclave host module 160.

Of course and as will be described in further detail later, enclave 162 need not be created by control routine 131. Indeed in some embodiments of the present disclosure enclave 162 may be created and/or instantiated in a pre-boot phase of computing device 100, e.g., prior to the execution of components of control routine 131 that may be needed to boot computing system 100. For example the enclave may be established by a BIOS boot loader or other bios application, e.g., prior to loading various components of control routine 131. Creating enclave 162 in this manner may be particularly useful when all or a portion of control routine 131 has been encrypted by an enclave, e.g., when computing device 100 is shut down.

Storage mapper module 151 may be in the form of hardware, software, or a combination of hardware and software that is generally configured to route data that is to be operated upon by a secure enclave to UMIM 152. For example and as will be described in detail later, in a full or partial disk encryption context storage mapper module 151 may be configured to route plain text data (e.g., from a user mode application, not shown in FIG. 1) and/or cipher text data (e.g., from disk or other memory, also not shown) to UMIM 152.

For the sake of illustration storage mapper module 151 is described herein as an independent component that operates to route data in the manner just described. However it should be understood that storage mapper module 151 need not be implemented in that manner. For example, storage mapper module may be implemented as part of or in conjunction with the storage stack (not shown) of storage 130. It will be appreciated that the nature and characteristics of the storage stack may differ depending on the nature of control routine 131, or more particularly, the type of operating system that is being executed on computing device 100. For example in the context of the LINUX® operating system, storage mapper module may be implemented in the context of the DeviceMapper framework, which is the Linux mechanism for mapping physical block devices to higher level virtual block devices, and is used in connection with the LINUX kernel mode disk encryption subsystem known as "dm-crypt." Of course, other implementations are possible and would be readily understood by those of skill in the art. Regardless of the particular implementation, it should be understood that storage mapper module 151 is generally configured to route data (plain text, cipher text, or otherwise) to UMIM 152, as previously described.

Buffer 154 may be configured such that it may be accessible by kernel and user mode applications that may be executed on processor 110. Buffer 154 may therefore be understood as a "shared" buffer that can be written to and read from by kernel and user mode applications. For example in some embodiments UMIM may write or cause data (e.g., cipher text or plain text) to be written to buffer 154, after which that data may be read from buffer 154 by enclave host module 160 (or, more specifically, enclave 162). Enclave 162 may perform encryption operations on the data as required, producing "processed" data that may then be written to buffer 154. UMIM may then retrieve the processed data from buffer 154 and direct it to other components of computing device 100, e.g., storage mapper module 151, as will be explained in further detail with regard to FIG. 2.

Buffer 154 may be any suitable type of shared buffer. Without limitation, in some embodiments buffer 154 is in the form of a ring (circular) buffer. As will be appreciated a ring buffer may be a data structure that uses a single fixed size buffer as if it were connected end to end, such that the buffer has a first in, first out (FIFO) characteristic. In such instances UMIM 152 may write data into buffer 154 for processing by enclave 162, which may perform encryption operations on the data as discussed previously.

Enclave 162 in some embodiments may perform encryption operations on data in buffer 154 "in place," i.e., such that the resulting processed data (cipher text or plain text, as appropriate) is maintained at the same location within buffer 154 as the (unprocessed) data. UMIM 152 may then read the processed data from buffer 154 as discussed previously, e.g., on a FIFO basis. This process may be facilitated, for example, by executing UMIM 152 and enclave host module 160 on different threads of processor 110. For example, as UMIM 152 reads processed data from buffer 154, it may replace that data with additional (unprocessed) data (if needed). The additional data may then be read by enclave host module 160 and operated upon by enclave 162, as discussed above. Put in other terms, UMIM 152 may operate to fill buffer 154 with unprocessed data as enclave host module 160 drains unprocessed data from buffer 154 and provides the unprocessed data to enclave 162 for the execution of encryption operations. Likewise, enclave host module 160 may fill the buffer 154 with processed data as UMIM 152 reads processed data from buffer 154 and provides it to storage mapper module 151. This may allow a single activation of enclave 162 (e.g., execution of a single EENTER instruction to pass control to enclave 162) to perform encryption operations on a large amount of data and/or a plurality of smaller batches of data before enclave 162 is deactivated (e.g., before execution of an EEXIT instruction). This can potentially reduce the overhead associated with repeated entry and exit from enclave 162, particularly when workload is high.

As noted previously enclave 162 may be hosted by enclave host module 160. In general, enclave host module 160 may include hardware, software, or a combination of hardware and software that is configured to manage the operation of enclave 162. For example, in some embodiments enclave host module 160 may be configured as a disk or other service that may be executed within the context of control routine 131. In some embodiments, enclave host module 160 may be a user mode application and/or service which may receive an indication from one or more kernel mode applications (e.g., UMIM 152) that causes enclave 162 to run. For example in some embodiments enclave host module 160 may receive a buffered data indication from UMIM 152, signifying that data is present in buffer 154. In response to the buffered data indication, enclave host module 160 may cause enclave 162 to run, e.g., by executing or causing the execution of an EENTER instruction that passes control to enclave 162. Enclave 162 may then execute encryption operations on data in buffer 154, as generally described above. Of course other mechanisms for controlling the operation of enclave 162 are possible, and are envisioned by the present disclosure.

The buffered data indication may be provided in any suitable manner. In some embodiments, UMIM 152 may be configured to provide the buffered data indication to enclave host module 160. In instances wherein UMIM 152 and enclave host module 160 may communicate directly with one another, for example, UMIM 152 may issue a message containing the buffered data indication to enclave host module 160. In many contexts however it may not be possible for UMIM 152 (a kernel mode component) to communicate directly with enclave host module 160 (a user mode component). In such instances UMIM 152 and enclave host module 160 may be configured to communicate with one another via a proxy.

For example enclave host module 160 may be configured to issue a call (e.g., a read command) directed to a kernel mode proxy. The kernel mode proxy may be established by UMIM 152 or some other component of computing device 100, such as storage mapper module 151. The kernel mode proxy may be or include a file or other data structure that may be exposed to a user mode application. For example, in instances where control routine 131 is a LINUX operating system, the proxy may be set up as a miscellaneous device, which may result in the creation of a file or other data structure that may be accessible by enclave host module 160. In such instances, enclave host module 160 may be configured to issue a system call (e.g., a read command) directed towards the proxy (or, more particularly, a file or other data structure associated with the proxy), as discussed above.

With this in mind UMIM 152 in some embodiments may be configured to intercept the system call issued by enclave host module 160, and to hold that call until data is present in buffer 154. When data is present in buffer 154, UMIM 152 may release the system call. The release of the system call may be understood by enclave host module 160 as a buffered data indication signifying that data is present in buffer 154. Enclave host module 160 may then activate enclave 162 (e.g., by causing the execution of an EENTER instruction). Enclave 162 may then perform encryption operations on data in buffer 154, as previously described. Execution of encryption operations may continue until no (unprocessed) data remains in buffer 154. At that time, enclave host module 160 may issue another system call (e.g., a read command) targeting the proxy (or, more particularly, a file or other data structure associated with the proxy). Like the prior system call, the additional system call issued by enclave host module 162 may be intercepted by UMIM 152 and held until data is present in buffer 154. Depending on the application, enclave 162 may be disabled (e.g., it may release control by the execution of an EEXIT instruction) immediately upon the issuance of a system call while enclave 162 is active, after the expiration of a threshold period of time, or in response to the fulfillment of some other criteria.

Figure 2:
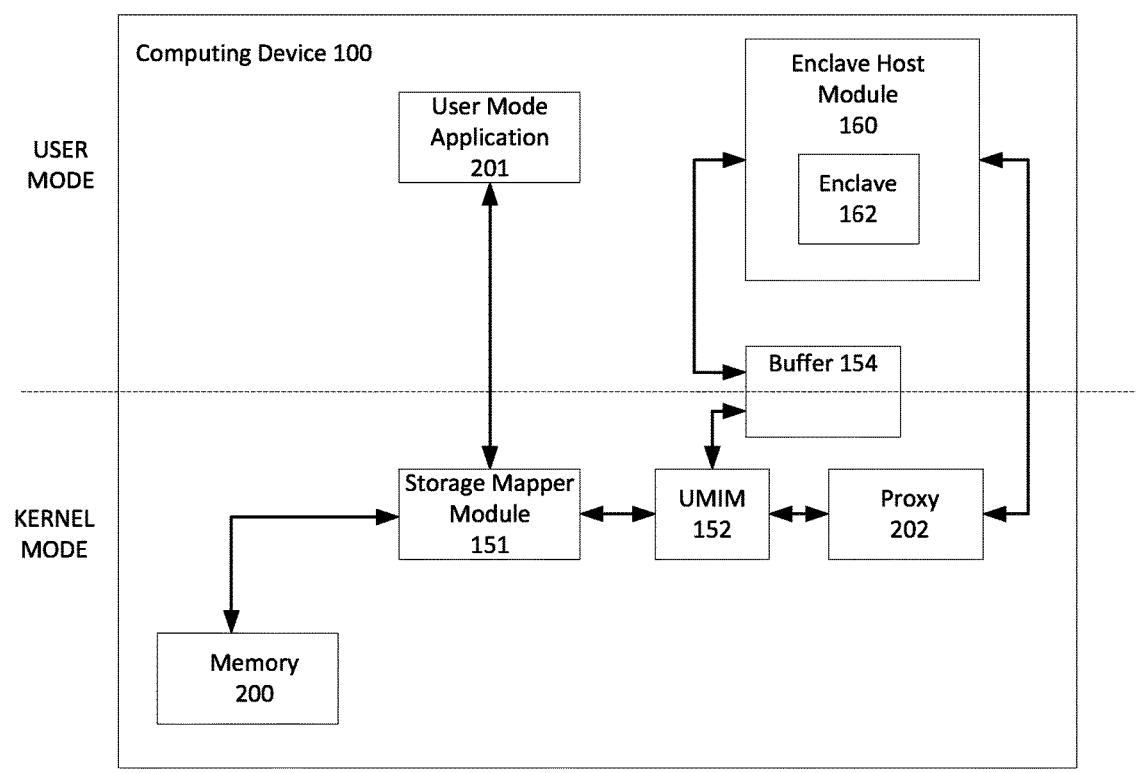
FIG. 2 illustrates a portion of an example embodiment of an electronic device implementing a secure enclave to harden data encryption operations consistent with the present disclosure.

To further explain the technologies of the present disclosure reference is now made to FIG. 2, which is a block diagram illustrating the interaction of various components of computing device 100 associated with the performance of encryption operations by a secure enclave. In particular, FIG. 2 depicts which of the various components of computing device 100 may operate in user mode and kernel mode, and the respective interactions between such components. For the sake of illustration, operations that may be performed by the components of FIG. 2 will be described in a use case in which computing system 100 (or, more particularly, control routine 131) is configured to implement full disk encryption. It should be understood that in such a use case, data that is stored or is to be stored on a disk or other memory (e.g., memory 200) is encrypted (i.e., is in the form of cipher text). Likewise, encrypted data (cipher text) read from memory 200 is decrypted so that it may be utilized by applications executing on computing device 100, e.g., a user mode application.

With the foregoing in mind FIG. 2 depicts computing device 100 as including many of the same components that were described above in connection with FIG. 1, i.e., storage mapper module 151, UMIM 152, buffer 154, enclave host module 160, and enclave 162. The nature of such components is therefore not described again. In addition, FIG. 2 depicts computing device 100 as including memory 200, user mode application 201, and proxy 202.

In some embodiments memory 200 is non-volatile memory that may be local to or remote from storage 130. Without limitation, in some embodiments memory 200 is local to storage 130. Regardless of its location, memory 200 may be operable to store data (in the form of plain text or cipher text. As noted above in a use case where computing device 100 implements full disk encryption, it should be understood that data stored in memory 200 is in the form of cipher text.

In the course of operation user mode application 201 may cause computing device (or some component thereof) to issue a read request targeting cipher text that is stored in memory 200. For example, in some embodiments user mode application 201 may issue a read request to storage mapper module 151, which may interact with or be integral to the storage stack of a control routine executing on computing device 100. In any case, storage mapper module 151 may issue or cause the issuance of a read command to memory 200. The read command may be configured to cause cipher text (data) stored at the relevant portions of memory 200 to be read out and provided to storage mapper module 151. In response to receiving the cipher text from memory 200, storage mapper module 151 may be configured to relay the cipher text to UMIM 152, as generally described above.

Alternatively or additionally, in the course of operation user mode application 201 may cause computing device or some component thereof to issue a write request to write data (e.g. plain text) to memory 200. For example, in some embodiments user mode application 201 may issue a write request to storage mapper module 151. In the context of a full disk encryption use case, it may be necessary to encrypt the plaintext of the data prior to it being written to memory 200. In such instances (or in other use cases in which encryption of data is desired), storage mapper module 151 may be configured to forward the data (plain text) associated with the write request to UMIM 152, in the same manner as generally described above.

In response to receiving data (in the form of cipher text or plain text) from storage mapper module 151, UMIM 152 may queue all or a portion of the data to buffer 154. As mentioned above buffer 154 may be in the form of a shared buffer (e.g., a ring buffer) that may be accessed by UMIM and user mode applications, such as enclave host module 160. Simultaneously or subsequent to queuing cipher text in buffer 154, UMIM 152 may provide a buffered data indicator to indicate to enclave host module 160 that data (specifically cipher text) is present in buffer 154. As explained previously in some embodiments UMIM 152 may provide the buffered data indicator to enclave host module 160 at least in part by releasing a system call (e.g., read request) targeting a proxy, e.g., proxy 202.

As noted above proxy 202 may be in the form of a kernel mode device (or associated data structure) that may be exposed to user mode applications, such as enclave host module 160. Proxy 202 may be created in any suitable manner, and by any suitable component of computing device 100. For example, a storage mapper module and/or a UMIM may cause the creation of proxy 202, e.g., by processor 101. Without limitation, in some embodiments proxy 202 may be established when storage mapper module 151 is enabled (e.g., loaded), UMIM 152 is enabled (e.g., loaded), or both. In any case, enclave host module 160 may issue a system call targeting proxy 202. UMIM 152 may intercept that system call and hold it until data is present in buffer 154. Once data is queued in buffer 154, UMIM 152 may release the system call, thereby providing a buffered data indicator to enclave host module 160 that signifies that data is present in buffer 154. Of course, releasing a system call targeting proxy 202 is just one example of how UMIM 152 may indicate the presence of data in buffer 154 to enclave host module 160. Other methods of providing a buffered data indicator are possible, as would be understood by one of ordinary skill in the art.

In some embodiments it may be desirable for UMIM 152 to provide a buffered data indicator to enclave host module 160 that is specific to whether data in buffer 154 is in the form of plain text or cipher text and thus, whether enclave 162 is to encrypt or decrypt the data therein. In this regard, proxy 202 may be configured to provide (or be in the form of) first and second data structures. Consistent with the foregoing description, enclave host module 160 may issue respective first and second system calls targeting the first and second data structures. UMIM 152 may intercept and hold the first and second system calls in the same manner as described above. After queuing data in buffer 154, UMIM 152 may then issue a buffered data indicator to enclave host module 160 that not only signifies the presences of data in buffer 154, but also indicates what type of operation (encryption or decryption) is to be performed thereon by enclave 162.

For example, UMIM 152 may release the first system call issued by enclave host module 160 and targeting a first data structure associated with proxy 202, while continuing to hold the second system call targeting the second data structure associated with proxy 202, thereby indicating to enclave host module 160 that data in buffer 154 is to be encrypted. Likewise, UMIM 152 may release the second system call issued by enclave host module 160 and targeting the second data structure associated with proxy 202, while continuing to hold the first system call targeting the first data structure associated with proxy 202, thereby indicating to enclave host module 160 that data in buffer 154 is to be decrypted. Of course, other methods of controlling whether encryption or decryption is to be performed by enclave 162 on data in buffer 154 are possible, and are envisioned by the present disclosure.

In response to receiving a buffered data indicator enclave host module 160 may pass control to enclave 162, e.g., by causing the execution of an EENTER instruction or other suitable command. Enclave 162 may then perform encryption operations on the data in buffer 154, e.g., using one or more keys stored therein. Such operations in some embodiments are performed within enclave 162, such that the keys stored therein are not exposed in system physical memory. The resulting processed data (cipher text or plain text, as appropriate) may then be written to buffer 154. In some embodiments, the processed data is written to the same location (address) in buffer 154 as its corresponding (unprocessed) data. In such instances, enclave 162 may be considered to perform encryption operations "in place."

When all of the data in buffer 154 has been processed, enclave host module 160 (or, more specifically, enclave 162) may request additional data for processing. In some embodiments enclave host module 160 may signify that it has completed processing data in buffer 154, e.g., by providing a completion indicator to UMIM 152. Enclave host module 160 may provide the completion indicator in any suitable manner, such as but not limited to issuing another system call targeting proxy 202. Alternatively or additionally, enclave host module 160 could be configured to issue a read or write request targeting an address (e.g., a virtual address) where no page is mapped, resulting in a page fault. In such instances UMIM 152 may be configured to monitor for such a fault, and to interpret such a fault as a completion indicator. In any case, in some embodiments the completion indicator may also indicate to UMIM 152 that additional data is being requested by enclave host module 160.

Of course the above techniques are just a few examples of how UMIM 152 may determine that enclave 162 has completed the performance of encryption operations on data in buffer 154. Other methods are possible, as would be understood by those of skill in the art.

In instances where the completion indicator is in the form of a system call targeting the proxy, UMIM 152 may in response to the completion indicator convey the processed data in buffer 154 to storage mapper module, which may in turn provide it to memory 200 or user mode application 201, as appropriate. In addition, UMIM 152 may also make a determination as to whether additional data is available for processing by enclave 162. If so, UMIM 152 may queue additional data in buffer 154 and release the system call targeting proxy 200 (or a data structure associated therewith), thereby providing another buffered data indicator to enclave host module 160 and signifying that additional data is present in buffer 154. This process may continue until enclave 162 has processed all of the data associated with the read/write request issued by user mode application 201.

In any case, UMIM 152 may convey processed data 152 from buffer 154 to storage mapper module 151. If the processed data is plain text, storage mapper module 151 may convey the plain text to user mode application 201 or another component of computing device 100, as desired. If the data is cipher text however, storage mapper module 151 may convey the cipher text to memory 200, e.g., by executing or causing the execution of a write command that writes the cipher text to memory 200.

In some embodiments, it may be desirable for storage mapper module 151 to determine whether data received from UMIM 152 is plain text or cipher text. In such instances UMIM 152 may make such a determination in any suitable manner, such as based on whether the data received from UMIM 152 is to be directed to user mode application 201 (plain text), or to memory 200 (cipher text). For example, storage mapper module 151 may determine that data received from UMIM 152 is cipher text in instances where storage mapper module 151 routed data to UMIM 152 in response to a write request, e.g., issued by user mode application 201 and targeting memory 200. Alternatively or additionally, storage mapper module 151 may determine that data received from UMIM 152 is cipher text in instances where storage mapper module 151 routed data to UMIM 152 in response to a read request, e.g., targeting some portion of memory 200 that contains encrypted data.

Figure 3:
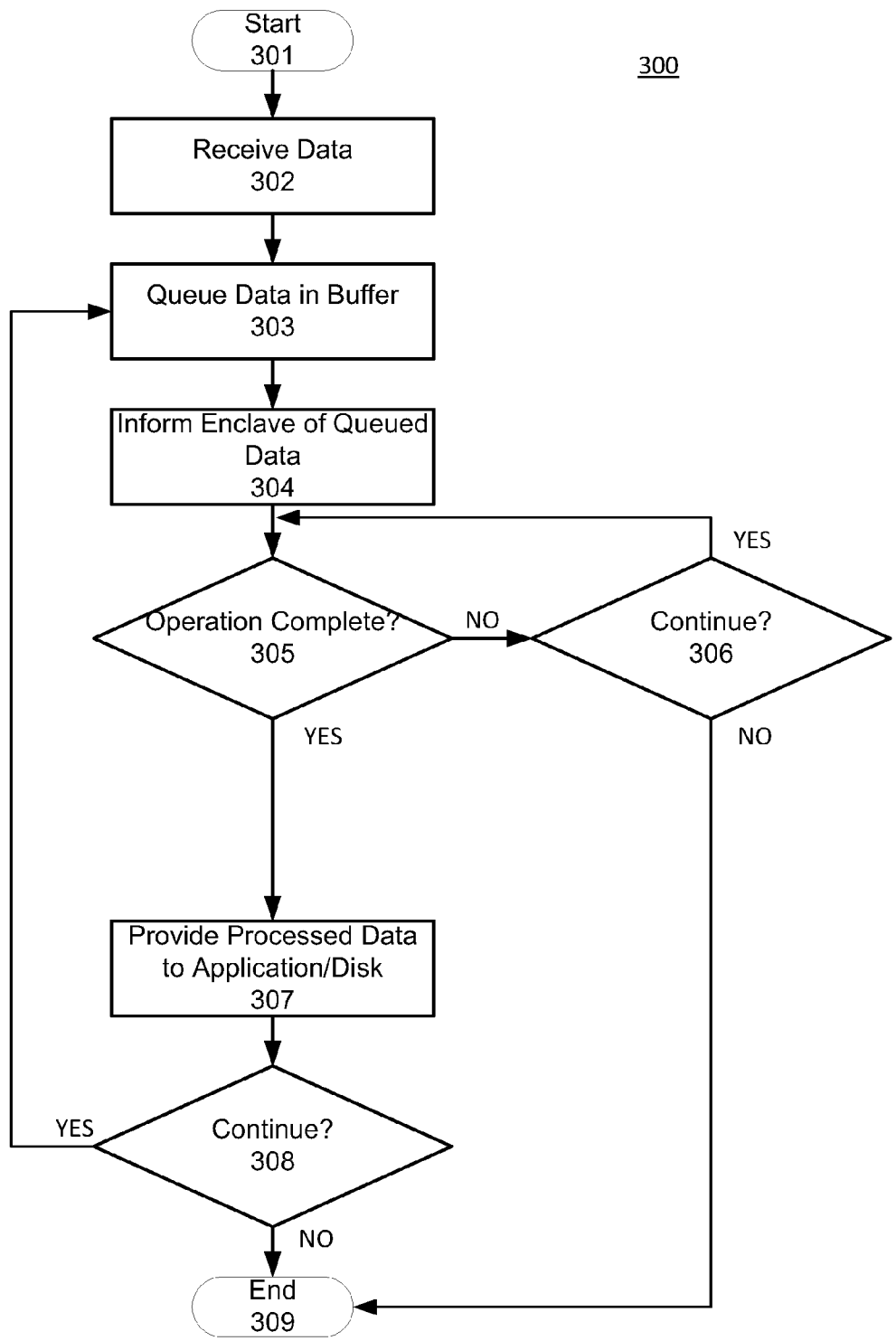
FIG. 3 is a flow chart of example operations of a kernel to user mode interface module in accordance with one example of a method of hardening data encryption operations with a secure enclave, consistent with the present disclosure.

Reference is now made to FIG. 3, which is a flow diagram illustrating operations of one example of a method of hardening disk encryption with a secure enclave, consistent with the present disclosure. In particular, FIG. 3 depicts example operations that may be performed by a user mode interface module (UMIM), as may be implemented in a computing device that is configured in a manner consistent with the foregoing description of FIGS. 1 and 2.

As shown, method 300 begins at block 301. The method may then proceed to block 302, wherein (unprocessed) data may be received. Consistent with the foregoing description, the unprocessed data may be received from a storage mapper module, which may route data to a UMIM in response to read or write request issued by a user mode application. As noted previously, the (unprocessed) data may be in the form of plain text or cipher text, and may be considered "unprocessed" as it will be operated upon by a secure enclave.

In any case, once (unprocessed) data is received the method may proceed to block 303, wherein the (unprocessed) data may be queued in a buffer. As noted previously, the buffer may be in the form of a shared buffer that is accessible by both kernel level and user level components of a computing device, such as a kernel level UMIM (kernel level), a user level enclave management module, and/or a user level enclave. Without limitation, the buffer in some embodiments is a ring buffer.

Once data is queued in the buffer the method may proceed to block 304, wherein an enclave may be informed of the presence of queued data in the buffer. Consistent with the foregoing description, the enclave may be informed of the presence of queued data in any suitable manner, such as but not limited to the release of a system call (e.g., read request) targeting a proxy. Of course, the enclave could be informed of the presence of queued data in some other manner, as would be appreciated by those of skill in the art. In any case, informing the enclave of the presences of queued data may cause the enclave to begin performing encryption operations on the queued data. The processed data (plain text or cipher text, as appropriate) may be stored in the same buffer (e.g., where the enclave performs encryption or decryption in place) or a different buffer that may also be shared between kernel and user mode components.

Once the enclave is informed of the presence of queued data the method may proceed to block 305, wherein a determination may be made as to whether encryption operations have been completed on all or a portion of the (unprocessed) data in the buffer. As noted previously, this determination may be made, for example, based on the issuance and/or detection of a completion indicator. Without limitation, in some embodiments the completion indicator may be in the form of an additional system call (e.g., by an enclave management module) targeting the proxy. Of course, other methods of determining whether encryption operations are complete on all or a portion of the data in the buffer may be employed.

If it is determined that encryption operations on all or a portion of the data in the buffer are not complete, the method may proceed from block 305 to block 306, wherein a determination may be made as to whether the method is to continue. The outcome of block 306 may be conditioned on various factors, such as whether a threshold time period has expired, whether a higher priority job needs to be executed, etc. In any case if the method is not to continue, it may proceed to block 309 and end. If the method is to continue however, it may loop back to block 305.

When it is determined that encryption operations on all or a portion of the data in the buffer are complete, the method may proceed from block 305 to block 307. Pursuant to block 307, (processed) data may be read from the buffer and routed appropriately. For example where the (processed) data is plain text, it may be routed to a user level application (e.g., in response to a read request issued by the user level application and targeting cipher text stored in memory). Alternatively in instances where the (processed) data is cipher text, it may be routed to storage (e.g., in response to a write request issued by an application).

The method may then proceed from block 307 to block 308. Pursuant to block 308, a determination may be made as to whether the method is to continue. The outcome of this determination may for example be conditioned on whether encryption operations need to be performed on additional (unprocessed) data. If so, the method may continue and loop back to block 303, pursuant to which additional (unprocessed) data may be queued in the buffer. If encryption operations do not need to be performed on additional data, however, the method may proceed to block 309 and end.

It is noted that for the sake of illustration FIG. 3 depicts an embodiment in which the determination pursuant to block 308 follows the provision of processed data pursuant to block 307. It should be understood that the execution of the operations of block 308 need not follow those of block 307, and in some embodiments may be performed prior to or concurrently with the execution of block 307. Put in other terms, before or concurrently with the operations of block 307, a determination may be made as to whether encryption operations need to be performed on additional unprocessed data. If so, processed data from the buffer may be read and replaced with the additional data, which may then be operated upon by a secure enclave as noted above.

Figure 4:
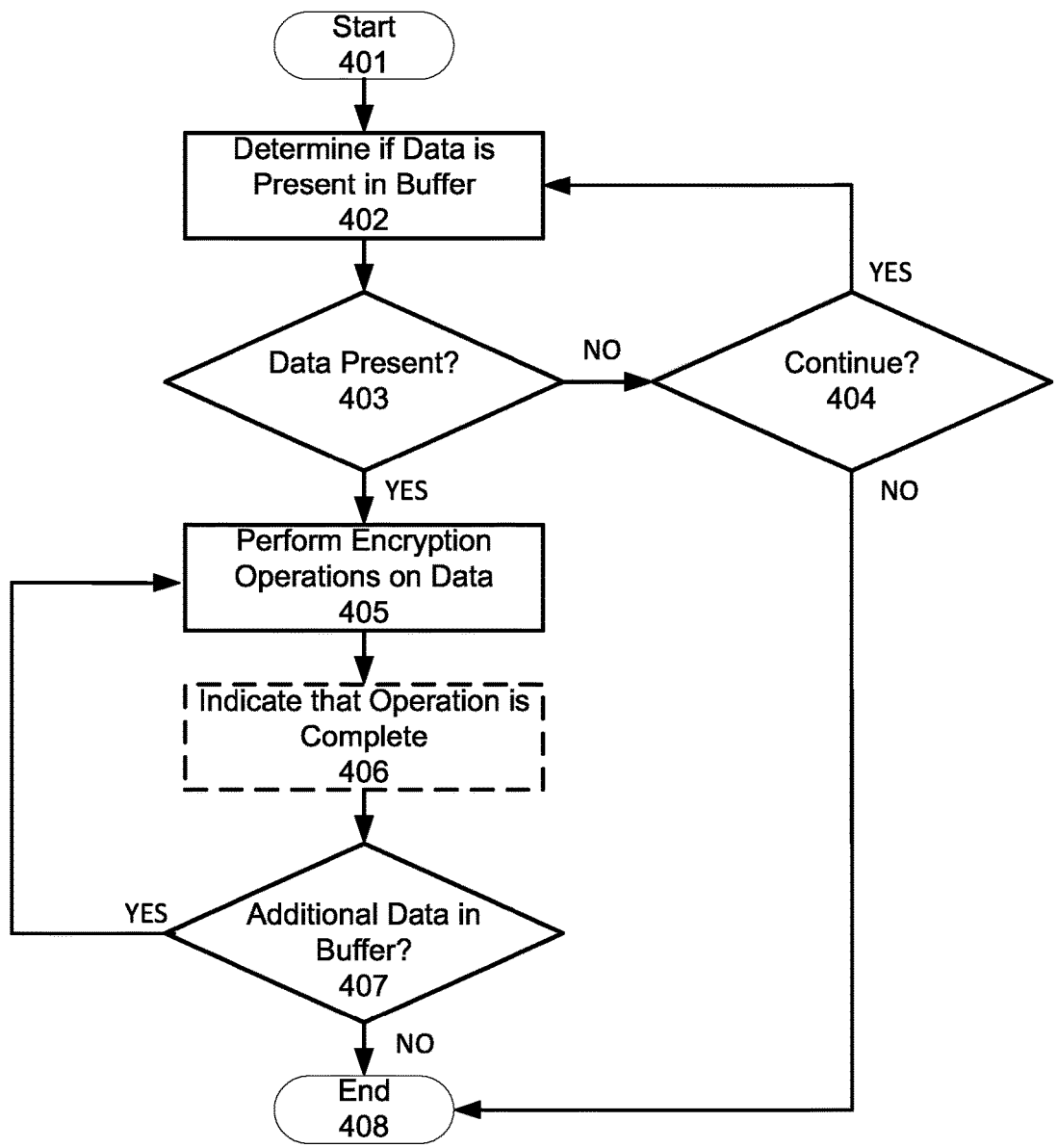
FIG. 4 is a flow chart of example operations of an enclave host module in accordance with one example of a method of hardening data encryption operations with a secure enclave consistent with the present disclosure.

Reference is now made to FIG. 4, which is a flow diagram illustrating operations of another example of a method of hardening disk encryption with a secure enclave, consistent with the present disclosure. In particular, FIG. 4 depicts example operations that may be performed by an enclave host module and/or a secure enclave, e.g., as may be implemented in a computing device that is configured in a manner consistent with the foregoing description of FIGS. 1 and 2.

As shown, method 400 begins at block 401. The method may then proceed to blocks 402 and 403, pursuant to which a determination may be made as to whether (unprocessed) data is present in a buffer that is accessible to both kernel and user mode components. Consistent with the foregoing description, the outcome of this determination may be conditioned on the receipt of some indication (e.g., from a UMIM or other component) that (unprocessed) data is present in the buffer. The indication may be, for example, the release of a system call (e.g., read request) targeting a proxy.

If pursuant to block 403 it is determined that (unprocessed) data is not present in the buffer, the method may proceed to block 404. Pursuant to block 404 a determination may be made as to whether the method is to continue. The outcome of block 404 may be conditioned on a variety of factors, such as but not limited to whether a predetermined time period has expired. In any case if it is determined that the method is not to continue, the method may proceed to block 408 and end. If the method is to continue however, it may loop back to block 402 from block 404.

If pursuant to block 403 it is determined that (unprocessed) data is present in the buffer, the method may proceed to block 405. Pursuant to block 405, encryption operations may be performed on the data in the buffer at least in part with a secure enclave. For example, an EENTER instruction may be executed to pass control to the secure enclave. The secure enclave may then read data from the buffer and perform encryption operations (e.g., encryption or decryption) on the data, as appropriate. In some embodiments the encryption operations may be performed within the enclave, e.g., using one or more keys stored therein. As the secure enclave performs encryption operations, the resulting processed data may be output from the enclave, e.g., back to the buffer (in the case of encryption or decryption in place) or to another buffer that may be shared between kernel and user mode components of a computing device.

The method may then proceed to optional block 406, wherein an indication may be provided (e.g., from a secure enclave or enclave host module) to a kernel mode component (e.g., a UMIM) that encryption operations have been performed on all or a portion of the data in the buffer. As noted previously, however, in some embodiments the kernel mode component may be able to independently determine whether encryption operations have been performed on data in the buffer, in which case the operations of block 406 may not be required.

Once pursuant to block 406 an indication has been provided that encryption operations are complete or if the operations of block 406 are not required, the method may proceed to block 407. Pursuant to block 407, a determination may be made as to whether additional (unprocessed) data is present in the buffer. If so, the method may loop back to block 405. If not, however, the method may proceed to block 408 and end.

As may be appreciated, the above described technologies may enable use cases in which a secure enclave may be leveraged to perform encryption operations on all or a portion of the data that is to be stored in the storage of a computing device. For example, the above described technologies may enable a secure enclave to be used to harden full disk encryption protocols, e.g., by using the secure enclave to encrypt all data stored on the disk with one or more keys protected by the enclave. Although this can provide several security benefits as described above, use of an enclave in the above described manner may result in the encryption of files, applications, and other data structures that may be needed to boot the computing device. Because such components would have been encrypted with one or more keys protected by the enclave, it may not be possible to boot computing device 100 unless the enclave is available to decrypt the necessary files.

With the foregoing in mind, another aspect of the present disclosure relates to technologies for enabling the use of an enclave to perform encryption operations (particularly decryption) prior to the booting of an operating system. In particular, one aspect of the present disclosure relates to the use of one or more pre-boot applications to create an enclave in a pre-boot phase (hereinafter, a "pre-boot enclave"). Once created, the pre-boot enclave may be used to decrypt encrypted data (e.g. files, applications, etc.) that were previously encrypted by an enclave (e.g., during runtime) and may be needed to boot a computing device.

It should be appreciated that applications responsible for initializing a computer system generally operate in kernel mode. For example, a basic input/output system ("BIOS") and unified extensible firmware interface ("UEFI") are applications (or collections of applications) that initialize the various platform devices (especially storage devices where an operating system resides) necessary to start up a computer system. These applications operate in kernel mode and may be referred to as "pre-boot applications," as they perform operations prior to the booting of an operating system. Components of operating system boot loaders (e.g. GRUB or LILO in the Linux® operating system, the Windows® boot loader in the Windows operating system) may also be considered pre-boot applications, as they perform operations that are needed before an operating system may be booted.

Figure 5:
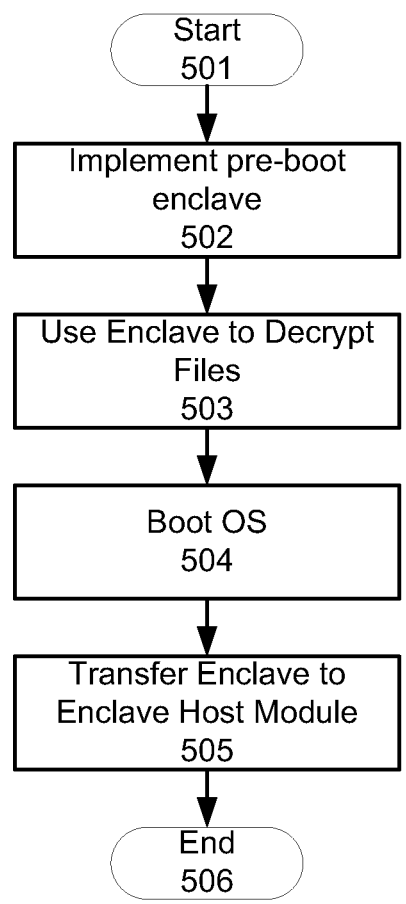
FIG. 5 is a flow chart of example operations of one example of a method of implementing a secure enclave in a pre-boot phase, consistent with the present disclosure.

With the foregoing in mind reference is made to FIG. 5, which is a flow diagram of logic operations that may be executed in accordance with a method of implementing a secure enclave in a pre-boot phase, consistent with the present disclosure. As shown, method 500 begins at block 501. The method may then proceed to block 502, pursuant to which a pre-boot enclave may be implemented. Implementation of the pre-boot enclave may be performed in any suitable manner, provided that the enclave has the requisite characteristics (e.g., measurement) and key(s) needed to decrypt encrypted data that may be needed to boot a computing device.

For example, in some embodiments a pre-boot enclave may be created in a pre-boot phase by one or more pre-boot applications (a BIOS application, UEFI application, operating system boot loader, etc.). In such embodiments the pre-boot application may cause instructions to be executed by a processor prior to an operating system being loaded. For example, the pre-boot application may cause instructions to be executed which cause a processor (e.g., processor 101) to allocate memory pages within an enclave page cache (e.g. EPC 114) for hosting an enclave. The pre-boot application may then cause the processor to extend an image of the enclave (e.g., which may be stored in protected memory accessible to the pre-boot application, e.g., BIOS memory, a TPM, other protected memory, or the like) to the memory pages allocated within the EPC. Alternatively or additionally, the pre-boot application may cause the execution of one or more instructions (e.g., an Ecreate instruction) that cause the creation of an enclave in the memory pages allocated within the EPC.

In some instances it may also be desirable for as pre-boot application to enable user mode support on a processor so that a pre-boot enclave may be implemented. In this regard, in some embodiments the pre-boot application may be configured to enable user mode support for a pre-boot enclave, e.g., by modifying one or more page tables, global descriptor tables, interrupt descriptor tables, and/or machine specific registers (e.g., MSRs 112).

As noted above, the technologies of the present disclosure can harden full disk encryption operations by enabling the use of a secure enclave during run time to encrypt data prior to the data being written to disk. In some embodiments, encryption of that data during run time may be performed within the enclave using an encryption key. Prior to shut down of a computing device, the secure enclave may protect the encryption key (and/or any relevant decryption keys) by wrapping (encrypting) the key(s) using a measurement of the enclave. As may be appreciated, it may be difficult to obtain the plain text of a key protected in this manner without an enclave that has the same (e.g., identical) measurement as the enclave that encrypted the key.

Accordingly in some embodiments the pre-boot enclave implemented pursuant to block 502 may be configured to have the same measurement as the enclave that encrypted the data stored on a disk (e.g., during runtime). Indeed, in many embodiments it may be advantageous for the measurement of the pre-boot enclave to be identical to the enclave that was used to perform data encryption during run time. With this in mind, numerous methods may be employed to create a pre-boot enclave that has a measurement that is the same as the measurement of the enclave that was previously used to encrypt data stored on a disk, e.g., during run time. For example, execution of a pre-boot application may cause a processor to allocate the same EPC range and/or memory pages for hosting a pre-boot enclave that were used for hosting the enclave that encrypted data in on a disk during run time.

In some embodiments the pre-boot application may when executed cause a processor to sequester the EPC range allocated to the pre-boot enclave, so as to prevent other components of the device (e.g., the OS) from overwriting that EPC range at a later time. Put in other terms, sequestering (reserving) the EPC range may prevent the enclave from being "paged out" by other components of a computing device. As may be appreciated, overwriting the EPC range (or other memory range) allocated to the enclave may change the measurement of the enclave. In turn this may make it difficult or impossible to decrypt a key that has been encrypted with a measurement of the enclave, potentially resulting in a system crash.

Returning to FIG. 5, once a pre-boot enclave has been implemented pursuant to block 502, the method may proceed to block 503. Pursuant to block 503 the pre-boot enclave may be applied to decrypt encrypted data that may be needed to boot a computing device. Various methods of using the pre-boot enclave for this purpose are envisioned and encompassed by the present disclosure. For example in the context of a UEFI boot, a UEFI driver (e.g., as part of a full disk encryption application or some other application) may be executed to direct encrypted data read from a disk to the secure enclave for decryption, after which the resulting plain text may be utilized to boot a computing device. More particularly, in some embodiments the UEFI driver may operate to expose the BLOCK-IO interface upon which a file system could be mounted, and to filter traffic through the BLOCK-IO protocol of an encrypted disk/partition to the pre-boot enclave. In this way, the UEFI driver may direct encrypted data read from the disk to the pre-boot enclave for decryption. Similarly, the UEFI driver may route the resulting plaintext appropriately so as to facilitate booting of the system.

As or once encrypted data needed to boot an OS is decrypted by the pre-boot enclave, the method may proceed from block 503 to block 504, pursuant to which the OS may be booted. The method may then proceed to block 505, wherein the pre-boot enclave may be passed to a user mode component (e.g., enclave host module 160).

As used herein, "passing" a pre-boot enclave to a user mode component includes allowing the pre-boot enclave to remain (e.g., in the EPC 114), such that it may be used by kernel mode components (e.g., storage mapper module 151) during run time, as discussed above. In some examples, a pre-boot application may pass the pre-boot enclave to the user mode component by conveying the EPC range a1ssigned to the pre-boot enclave to enclave host module 160. This may be performed, for example, by executing a mapping operation to map the EPC range (or other virtual memory address range) allocated to the pre-boot enclave to enclave host module 160, e.g. using advanced configuration and power interface (ACPI) tables, UEFI variables, a fixed memory address, combinations thereof, and the like. Once the pre-boot enclave has been transferred, the method may proceed to block 506 and end.

Another aspect of the present disclosure relates to a computer readable storage medium that contains computer readable instructions which when executed by a processor cause the processor (or a device containing the processor) to perform operations consistent with the present disclosure. When used the computer readable storage medium may be in the form of an article of manufacture. In some examples, the computer readable storage medium may be a non-transitory computer readable medium or machine readable storage medium, such as but not limited to an optical, magnetic or semiconductor storage medium. In any case the storage medium may store various types of computer executable instructions, such as instructions to the operations of the method of one or more of FIGS. 3, 4, and 5. Non-limiting examples of suitable computer readable storage media that may be used include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like.

EXAMPLES

The following examples pertain to further embodiments. The following examples of the present disclosure may comprise subject material such as a system, a device, a method, a computer readable storage medium storing instructions that when executed cause a machine to perform acts based on the method, and/or means for performing acts based on the method, as provided below.

Example 1

According to this example there is provided a computing device configured to harden data encryption with a secure enclave executed in user mode; including: a processor; a memory; and a user mode interface module at least partially implemented in a kernel mode of the processor, wherein the user mode interface module is to: queue unprocessed data in a shared buffer that is accessible to the user mode interface module and an enclave host module executable at least in part in a user mode of the processor, the enclave host module hosting a secure enclave; and provide a buffered data indicator to the enclave host module, the buffered data indicator being configured to cause the secure enclave to perform encryption operations on the unprocessed data to produce processed data.

Example 2

This example includes any or all of the features of example 1, and further includes a storage mapper module executable at least in part in the kernel mode, wherein the user mode interface module is further to receive the unprocessed data from the storage mapper module.

Example 3

This example includes any or all of the features of example 2, wherein the storage mapper module is to intercept one or more read requests from an application executed at least in part in the user mode, and to redirect unprocessed data targeted by the one or more read requests to the user mode interface module.

Example 4

This example includes any or all of the features of example 2, wherein: the user mode interface module is further to receive the processed data; and the storage mapper module is further to receive the processed data from the user mode interface module.

Example 5

This example includes any or all of the features of example 4, wherein the storage mapper module is further to determine whether the processed data is plain text or cipher text.

Example 6

This example includes any or all of the features of example 3, wherein the unprocessed data targeted by the one or more read requests includes cipher text.

Example 7

This example includes any or all of the features of example 6, wherein the user mode interface module is to queue at least a portion of the cipher text in the shared buffer, and the encryption operations comprise decrypting the cipher text queued in the shared buffer.

Example 8

This example includes any or all of the features of any one of examples 2 to 7, wherein the storage mapper module is to intercept one or more write requests from an application executed at least in part in the user mode, and to redirect unprocessed data associated with the one or more write requests to the user mode interface module.

Example 9

This example includes any or all of the features of example 8, wherein the unprocessed data associated with the one or more write requests is plain text.

Example 10

This example includes any or all of the features of example 9, wherein the user mode interface module is to queue the plain text in the shared buffer, and the encryption operations comprise encrypting the plaintext queued in the buffer.

Example 11

This example includes any or all of the features of any one of examples 1 to 10, wherein: the enclave host module is to issue a system call to a proxy that is exposed to both the enclave host module and the user mode interface module; the user mode interface module is to intercept the system call; and the user mode interface module is to provide the buffered data indicator at least in part by releasing the system call.

Example 12

This example includes any or all of the features of example 11, wherein the proxy includes a kernel mode device or data structure.

Example 13

This example includes any or all of the features of any one of examples 11 and 12, wherein the user mode interface module is further to create the proxy.

Example 14

This example includes any or all of the features of any one of examples 1 to 13, wherein the secure enclave is to: perform the encryption operations using at least one key; and prior to shutdown of the computing device, the secure enclave encrypts the key at least in part with a measurement of the enclave.

Example 15

This example includes any or all of the features of example 14, wherein secure enclave is to perform the encryption operations within the enclave.

Example 16

This example includes any or all of the features of any one of examples to 15, wherein the secure enclave is to perform the encryption operations in place, such that the processed data is written to the same location in the shared buffer as a corresponding portion of the unprocessed data.

Example 17

This example includes any or all of the features of any one of examples to 16, wherein the shared buffer is a ring buffer.

Example 18

This example includes any or all of the features of example 17, wherein: the enclave host module is operable to read and provide unprocessed data from the ring buffer to the enclave while the user mode interface module queues the unprocessed data in the ring buffer; the enclave host module is further operable to queue the processed data produced by the secure enclave into the ring buffer; and the user mode interface module is further operable to remove the processed data from the ring buffer while the enclave host module queues the processed data in the ring buffer.

Example 19

This example includes any or all of the features of any one of examples 1 to 18, wherein the enclave host module is further operable to provide a completion indicator to indicate to the user mode interface module that at least a portion of the encryption operations executed by the secure enclave are complete.

Example 20

This example includes any or all of the features of example 19, wherein the enclave host module provides the completion indicator at least in part by issuing a system call targeting a proxy that is exposed to both the enclave host module and the user mode interface module.

Example 21

This example includes any or all of the features of example 20 wherein the proxy includes a kernel mode device or data structure.

Example 22

According to this example there is provided a method of hardening encryption operations with an enclave executed in user mode, including, with a user mode interface module to be executed in a kernel mode of a processor: receiving unprocessed data; queueing the unprocessed data in a shared buffer that is accessible to the user mode interface module and an enclave host module executed at least in part in a user mode of the processor, the enclave host module hosting a secure enclave; and providing a buffered data indictor to the enclave host module, the buffered data indictor being configured to cause the secure enclave to perform encryption operations on the unprocessed data to produce processed data.

Example 23

This example includes any or all of the features of example 22, wherein the user mode interface module receives the unprocessed data from a storage mapper module executed in the kernel mode of the processor.

Example 24

This example includes any or all of the features of example 23, wherein the unprocessed data includes plain text, cipher text, or a combination thereof.

Example 25

This example includes any or all of the features of example 23, further including, with the user mode interface module: receiving the processed data from the buffer; and providing the processed data to the storage mapper module.

Example 26

This example includes any or all of the features of example 22, and further includes, with the user mode interface module: queuing the unprocessed data in the shared buffer and receiving the processed data from the shared buffer at substantially the same time.

Example 27

This example includes any or all of the features of example 24, wherein the unprocessed data is plain text, and the buffered data indicator is configured to cause the secure enclave to encrypt the plain text.

Example 28

This example includes any or all of the features of example 24, wherein the unprocessed data is cipher text, and the buffered data indicator is configured to cause the secure enclave to decrypt the cipher text.

Example 29

This example includes any or all of the features of any one of examples 22 to 28, wherein providing the buffered data indicator includes releasing a system call targeting a proxy by the user mode interface module.

Example 30

This example includes any or all of the features of example 29, wherein the system call was issued by the enclave host module.

Example 31

This example includes any or all of the features of example 29, and further includes, with the user mode interface module: causing the creation of the proxy.

Example 32

This example includes any or all of the features of any one examples 29 to 31, wherein the proxy includes a kernel mode device or data structure.

Example 33

This example includes any or all of the features of any one of examples 22 to 32, and further includes, with the secure enclave: performing the encryption operations with at least one key protected by the secure enclave.

Example 34

This example includes any or all of the features of any one of examples 22 to 33, wherein the encryption operations are performed within the secure enclave.

Example 35

This example includes any or all of the features of any one of examples 22 to 34, and further includes, with the secure enclave: performing the encryption operations in place, such that the processed data is written to the same location in the shared buffer as a corresponding portion of the unprocessed data.

Example 36

This example includes any or all of the features of any one of examples 22 to 35, wherein the shared buffer is a ring buffer.

Example 37

This example includes any or all of the features of example 36, and further includes: with the enclave host module: reading and providing the unprocessed data from the ring buffer to the secure enclave while the user mode interface module queues the unprocessed data in the ring buffer; queueing the processed data into the ring buffer; and with the user mode interface module: removing the processed data from the ring buffer while the enclave host module queues the processed data in the ring buffer.

Example 38

This example includes any or all of the features of any one of examples 22 to 27, and further includes, with the enclave host module: providing a completion indicator to the user mode interface module to indicate that at least a portion of the encryption operations executed by the secure enclave are complete.

Example 39

This example includes any or all of the features of example 38, further including, with the enclave host module: providing the completion indicator at least in part by issuing a system call targeting a proxy that is exposed to both the enclave host module and the user mode interface module.

Example 40

This example includes any or all of the features of example 39, wherein the proxy includes a kernel mode device or data structure.

Example 41

According to this example there is provided at least one computer readable medium including computer readable instructions hardening encryption operations with an enclave executed in user mode, which when executed by a processor of a computing device cause the computing device to perform the following operations including:
receiving unprocessed data; queueing the unprocessed data in a shared buffer that is accessible to the user mode interface module and an enclave host module executed at least in part in a user mode of the processor, the enclave host module hosting a secure enclave; and providing a buffered data indictor to the enclave host module, the buffered data indictor being configured to cause the secure enclave to perform encryption operations on the unprocessed data to produce processed data.

Example 42

This example includes any or all of the features of example 41, wherein the user mode interface module receives the unprocessed data from a storage mapper module executed in the kernel mode of the processor.

Example 43

This example includes any or all of the features of example 42, wherein the unprocessed data includes plain text, cipher text, or a combination thereof.

Example 44

This example includes any or all of the features of example 42, wherein the instructions when executed further cause the performance of the following operations including, with the user mode interface module: receiving the processed data from the buffer; and providing the processed data to the storage mapper module.

Example 45

This example includes any or all of the features of any one of examples 41 to 44, wherein the instructions when executed further cause the performance of the following operations including, with the user mode interface module: queuing the unprocessed data in the shared buffer and receiving the processed data from the shared buffer at substantially the same time.

Example 46

This example includes any or all of the features of example 43, wherein the unprocessed data is plain text, and the buffered data indicator is configured to cause the secure enclave to encrypt the plain text.

Example 47

This example includes any or all of the features of example 43, wherein the unprocessed data is cipher text, and the buffered data indicator is configured to cause the secure enclave to decrypt the cipher text.

Example 48

This example includes any or all of the features of any one of examples 41 to 47, wherein providing the buffered data indicator includes releasing a system call targeting a proxy by the user mode interface module.

Example 49

This example includes any or all of the features of example 48, wherein the system call was issued by the enclave host module.

Example 50

This example includes any or all of the features of example 48, wherein the instructions when executed further result in the performance of the following operations including, with the user mode interface module: causing the creation of the proxy.

Example 51

This example includes any or all of the features of example 48, wherein the proxy includes a kernel mode device or data structure.

Example 52

This example includes any or all of the features of any one of examples 41 to 51, wherein the instructions when executed further result in the performance of the following operations including, with the secure enclave: performing the encryption operations with at least one key protected by the secure enclave.

Example 53

This example includes any or all of the features of any one of examples 41 to 52, wherein the encryption operations are performed within the secure enclave.

Example 54

This example includes any or all of the features of any one of examples 41 to 53, wherein said instructions when executed further result in the performance of the following operations comprising, with said secure enclave: performing the encryption operations in place, such that the processed data is written to the same location in the shared buffer as a corresponding portion of the unprocessed data.

Example 55

This example includes any or all of the features of any one of examples 41 to 54: wherein the shared buffer is a ring buffer.

Example 56

This example includes any or all of the features of example 55, wherein the instructions when executed further result in the performance of the following operations including: with the enclave host module: reading and providing the unprocessed data from the ring buffer to the secure enclave while the user mode interface module queues the unprocessed data in the ring buffer; queueing the processed data into the ring buffer; and with the user mode interface module: removing the processed data from the ring buffer while the enclave host module queues the processed data in the ring buffer.

Example 57

This example includes any or all of the features of example 56, wherein the instructions when executed further result in the performance of the following operations including, with the enclave host module: providing a completion indicator to the user mode interface module to indicate that at least a portion of the encryption operations executed by the secure enclave are complete.

Example 58

This example includes any or all of the features of example 57, wherein the instructions when executed further result in the performance of the following additional operations including, with the enclave host module: providing the completion indicator at least in part by issuing a system call targeting a proxy that is exposed to both the enclave host module and the user mode interface module.

Example 59

This example includes any or all of the features of example 58, wherein the proxy includes a kernel mode device or data structure.

Example 60

According to this example there is provided a computing device configured to harden data encryption with a secure enclave executed in user mode; including: a processor; a memory; and user mode interface means at least partially implemented in a kernel mode of the processor to: queue unprocessed data in a shared buffer that is accessible to the user mode interface means and an enclave host means executable at least in part in a user mode of the processor, the enclave host means hosting a secure enclave; and provide a buffered data indicator to the enclave host means, the buffered data indicator being configured to cause the secure enclave to perform encryption operations on the unprocessed data to produce processed data.

Example 61

This example includes any or all of the features of example 60, and further includes storage mapper means executable at least in part in the kernel mode, wherein the user mode interface means is further to receive the unprocessed data from the storage mapper means.

Example 62

This example includes any or all of the features of example 61, wherein the storage mapper means is to intercept one or more read requests from an application executed at least in part in the user mode, and to redirect unprocessed data targeted by the one or more read requests to the user mode interface means.

Example 63

This example includes any or all of the features of example 61, wherein: the user mode interface means is further to receive the processed data; and the storage mapper means is further to receive the processed data from the UMIM.

Example 64

This example includes any or all of the features of example 63, wherein the storage mapper means is further to determine whether the processed data is plain text or cipher text.

Example 65

This example includes any or all of the features of example 62, wherein the unprocessed data targeted by the one or more read requests includes cipher text.

Example 66

This example includes any or all of the features of example 65, wherein the user mode interface means is to queue at least a portion of the cipher text in the shared buffer, and the encryption operations comprise decrypting the cipher text queued in the shared buffer.

Example 67

This example includes any or all of the features of any one of examples 61 to 66, wherein the storage mapper means is to intercept one or more write requests from an application executed at least in part in the user mode, and to redirect unprocessed data associated with the one or more write requests to the user mode interface means.

Example 68

This example includes any or all of the features of example 67, wherein the unprocessed data associated with the one or more write requests is plain text.

Example 69

This example includes any or all of the features of example 68, wherein the user mode interface means is to queue the plain text in the shared buffer, and the encryption operations comprise encrypting the plaintext queued in the buffer.

Example 70

This example includes any or all of the features of any one of examples 60 to 69, wherein: the enclave host means is to issue a system call to a proxy that is exposed to both the enclave host means and the user mode interface means; the user mode interface means is to intercept the system call; and the user mode interface means is to provide the buffered data indicator at least in part by releasing the system call.

Example 71

This example includes any or all of the features of example 70, wherein the proxy includes a kernel mode device or data structure.

Example 72

This example includes any or all of the features of example 70, wherein the user mode interface means is further to create the proxy.

Example 73

This example includes any or all of the features of any one of examples 60 to 72, wherein the secure enclave is to: perform the encryption operations using at least one key; and prior to shutdown of the computing device, the secure enclave encrypts the key at least in part with a measurement of the enclave.

Example 74

This example includes any or all of the features of example 73, wherein secure enclave is to perform the encryption operations within the enclave.

Example 75

This example includes any or all of the features of any one of examples 60 to 74, wherein the secure enclave is to perform the encryption operations in place, such that the processed data is written to the same location in the shared buffer as a corresponding portion of the unprocessed data.

Example 76

This example includes any or all of the features of any one of examples 60 to 75, wherein the shared buffer is a ring buffer.

Example 77

This example includes any or all of the features of example 76, wherein: the enclave host means is operable to read and provide unprocessed data from the ring buffer to the enclave while the user mode interface means queues the unprocessed data in the ring buffer; the enclave host means is further operable to queue the processed data produced by the secure enclave into the ring buffer; and the user mode interface means is further operable to remove the processed data from the ring buffer while the enclave host means queues the processed data in the ring buffer.

Example 78

This example includes any or all of the features of any one of examples 60 to 77, wherein the enclave host means is further operable to provide a completion indicator to indicate to the user mode interface means that at least a portion of the encryption operations executed by the secure enclave are complete.

Example 79

This example includes any or all of the features of example 78, wherein the enclave host means provides the completion indicator at least in part by issuing a system call targeting a proxy that is exposed to both the enclave host means and the user mode interface means.

Example 80

This example includes any or all of the features of example 79 wherein the proxy includes a kernel mode device or data structure.

Example 81

According to this example there is provided at least one computer readable medium comprising computer readable instructions for hardening encryption operations with an enclave executed in user mode, which when executed by a processor of a computing device cause the computing device to perform the method of any one of examples 22 to 40.

Example 82

According to this example there is provided an apparatus including means to perform the method of any one of examples 22 to 40.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed is:

1. A computing device configured to harden data encryption with a secure enclave executed in a user mode comprising:
a processor;
a memory;
an enclave host executable at least in part in said user mode of said processor, said enclave host hosting said secure enclave, said secure enclave being associated with one or more characteristics and encryption keys to encrypt unprocessed data;
a user mode interface at least partially implemented in a kernel mode of said processor, wherein said user mode interface is to:
create a pre-boot enclave in a pre-boot phase by allocating one or more memory pages within an enclaved page cache, said pre-boot enclave being associated with the same characteristics of said secure enclave and decryption keys corresponding to said encryption keys of said secure enclave to decrypt processed data;
queue unprocessed data in said enclaved page cache that is accessible to said user mode interface and said enclave host; and
provide, to said enclave host, a buffered data indicator configured to indicate the presence of unprocessed data in said enclaved page cache, and to cause said secure enclave to perform encryption operations on said unprocessed data in said enclaved page cache to produce processed data; and
a storage mapper executable at least in part in said kernel mode, wherein said storage mapper is to intercept one or more read or write requests from an application executed at least in part in said user mode, and to redirect unprocessed data targeted by said one or more read or write requests to said user mode interface.

2. The computing device of claim 1, wherein said user mode interface is further to receive said unprocessed data from said storage mapper.

3. The computing device of claim 1, wherein:
said user mode interface is further to receive said processed data; and
said storage mapper is further to receive said processed data from said user mode interface.

4. The computing device of claim 3, wherein said storage mapper is further to determine whether said processed data is plain text or cipher text.

5. The computing device of claim 1, wherein said unprocessed data targeted by said one or more read requests comprises cipher text, said user mode interface is to queue at least a portion of said cipher text in said enclaved page cache, and said encryption operations comprise decrypting said cipher text queued in said enclaved page cache.

6. The computing device of claim 1, wherein said enclaved page cache is a shared ring buffer.

7. The computing device of claim 1, wherein:
said storage mapper is to intercept one or more write requests from an application executed at least in part in said user mode, and to redirect unprocessed data associated with said one or more write requests to said user mode interface; and
unprocessed data associated with said one or more write requests is plain text, said user mode interface is to queue said plain text in said enclaved page cache, and said encryption operations comprise encrypting the plain text queued in said enclaved page cache.

8. The computing device of claim 1, wherein:
said enclave host is to issue a system call to a proxy that is exposed to both the enclave host and said user mode interface;
said user mode interface is to intercept said system call; and
said user mode interface is to provide said buffered data indicator at least in part by releasing said system call.

9. The computing device of claim 8, wherein said proxy comprises a kernel mode device or data structure.

10. The computing device of claim 1, wherein said secure enclave is to perform said encryption operations in place, such that said processed data is written to the same location in said enclaved page cache as a corresponding portion of said unprocessed data.

11. The computing device of claim 1, wherein said enclave host is further operable to provide a completion indicator to indicate to said user mode interface that at least a portion of the encryption operations executed by said secure enclave are complete.

12. A method of hardening encryption operations with an enclave executed in a user mode, comprising:
providing a user mode interface to be executed in a kernel mode of a processor;
receiving unprocessed data;
hosting a secure enclave using an enclave host executable at least in part in said user mode, wherein said secure enclave is associated with one or more characteristics and encryption keys to encrypt said unprocessed data;
creating a pre-boot enclave in a pre-boot phase by allocating one or more memory pages within an enclaved page cache, said pre-boot enclave being associated with the same characteristics of said secure enclave and decryption keys corresponding to said encryption keys of said secure enclave to decrypt processed data;
queueing said unprocessed data in said enclaved page cache that is accessible to said user mode interface and said enclave host; and
providing, to said enclave host, a buffered data indictor configured to indicate the presence of unprocessed data in said enclaved page cache, and to cause said secure enclave to perform encryption operations on said unprocessed data in said enclaved page cache to produce processed data, wherein said user mode interface receives said unprocessed data from a storage mapper executed in said kernel mode of said processor, said unprocessed data comprising plain text, cipher text, or a combination thereof, said storage mapper executable at least in part in said kernel mode, said storage mapper intercepting one or more read or write requests from an application executed at least in part in said user mode, and to redirect unprocessed data targeted by said one or more read or write requests to said user mode interface.

13. The method of claim 12, further comprising, with said user mode interface:
receiving said processed data from said enclaved page cache; and
providing said processed data to said storage mapper.

14. The method of claim 12, further comprising, with said user mode interface:
queuing said unprocessed data in said enclaved page cache and receiving said processed data from said enclaved page cache at substantially the same time.

15. The method of claim 12, wherein said unprocessed data is plain text, and said buffered data indicator is configured to cause said secure enclave to encrypt said plain text.

16. The method of claim 12, wherein said unprocessed data is cipher text, and said buffered data indicator is configured to cause said secure enclave to decrypt said cipher text.

17. The method of claim 12, wherein providing said buffered data indicator comprises releasing a system call targeting a proxy by said user mode interface.

18. At least one non-transitory computer readable medium comprising computer readable instructions hardening encryption operations with an enclave executed in a user mode, which when executed by a processor of a computing device cause the computing device to perform the following operations comprising:
receiving unprocessed data;
hosting a secure enclave using an enclave host executable at least in part in said user mode, wherein said secure enclave is associated with one or more characteristics and encryption keys to encrypt said unprocessed data;
creating a pre-boot enclave in a pre-boot phase by allocating one or more memory pages within an enclaved page cache, said pre-boot enclave being associated with the same characteristics of said secure enclave and decryption keys corresponding to said encryption keys of said secure enclave to decrypt processed data;
queueing said unprocessed data in said enclaved page cache that is accessible to a user mode interface and said enclave host; and
providing, to said enclave host, a buffered data indictor configured to indicate the presence of unprocessed data in said enclaved page cache, and to cause said secure enclave to perform encryption operations on said unprocessed data in said enclaved page cache to produce processed data, wherein said user mode interface receives said unprocessed data from a storage mapper executed in a kernel mode of said processor, said unprocessed data comprising plain text, cipher text, or a combination thereof, said storage mapper executable at least in part in said kernel mode, said storage mapper intercepting one or more read or write requests from an application executed at least in part in said user mode, and to redirect unprocessed data targeted by said one or more read or write requests to said user mode interface.

19. The non-transitory computer readable medium of claim 18, wherein said instructions when executed further cause the performance of the following operations comprising, with said user mode interface:
queuing said unprocessed data in said enclaved page cache and receiving said processed data from said enclaved page cache at substantially the same time.

20. The non-transitory computer readable medium of claim 18, wherein providing said buffered data indicator comprises releasing a system call targeting a proxy by said user mode interface.

21. The non-transitory computer readable medium of claim 18, wherein said enclaved page cache is a ring buffer, and wherein said instructions when executed further result in the performance of the following operations comprising:
with said enclave host:
reading and providing said unprocessed data from said ring buffer to said secure enclave while said user mode interface queues said unprocessed data in said ring buffer;
queueing said processed data into said ring buffer; and
with said user mode interface:
removing said processed data from said ring buffer while said enclave host queues said processed data in said ring buffer.

22. The non-transitory computer readable medium of claim 21, wherein said instructions when executed further result in the performance of the following operations comprising, with said enclave host:
providing a completion indicator to said user mode interface to indicate that at least a portion of the encryption operations executed by said secure enclave are complete.

\* \* \* \* \*